Jan. 24, 1939. G. JOHNSON 2,144,882
SNAP FASTENER STUD
Filed Feb. 19, 1937

Inventor:
Gustav Johnson.
by Walter S. Jones
Att'y.

Patented Jan. 24, 1939

2,144,882

UNITED STATES PATENT OFFICE 2,144,882

SNAP FASTENER STUD

Gustav Johnson, West Roxbury, Mass., assignor to United-Carr Fastener Corporation, Cambridge, Mass., a corporation of Massachusetts Application February 19, 1937, Serial No. 126,686

5 Claims. (Cl. 85—5)

My invention aims to provide improvements in snap fastener studs.

In the drawing, which illustrates a preferred embodiment of my invention:

My invention is similar to that disclosed in my United States Letters Patent No. 1,928,592, issued September 26, 1933, but embodies certain improvements over the aforementioned patent hereinafter set forth.

Figure 1:
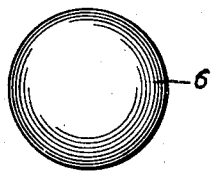
Figure 1 is a top plan view of my improved stud member.
Figure 2:
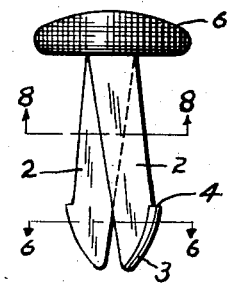
Fig. 2 is a front view of my snap fastener stud.
Figure 5:
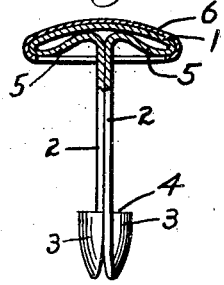
Fig. 5 is a fragmentary section taken along the line 5—5 of Fig. 7.

The particular stud member illustrated is formed from a single piece of metal and has a base 1 and two opposed flat, yieldable projections 2. Each projection 2 extends from the base 1 in substantially right-angular relation to the general plane of the base, as shown in Fig. 5, and a portion of one of the projections 2 overlaps the other (Fig. 2). Socket-engaging portions 3 are provided at the free ends of the projections 2 adapted to extend through an aperture of a cooperating part (not shown) and engage the material adjacent the aperture.

Figure 3:
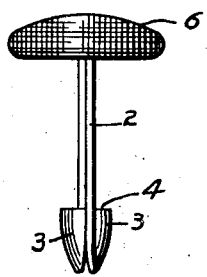
Fig. 3 is a side view of the stud shown in Fig. 2.
Figure 4:
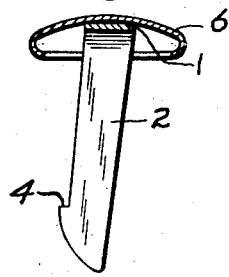
Fig. 4 is a section taken along the line 4—4 of Fig. 7.
Figure 6:
Fig. 6 is a section taken along the line 6—6 of Fig. 2.

The construction of my present fastener differs from that of the fastener of the above patent in that the socket-engaging portions 3, corresponding with means adapted for a similar purpose at the narrow edges and adjacent the free ends of the projections of the patent, are curled out of the lateral plane of the projections. Each of the portions 3 is of substantially triangular shape (Figs. 3 and 5) and curved slightly in cross-section, as most clearly shown in Fig. 6. Each of the portions 3 is disposed relative to a projection 2 with its apex at the free end of the projection and one side integral with a narrow edge of the projection. The other side of the attaching portion 3 from that integral with the narrow edge of the projection is disposed in substantially superposed spaced relation to a flat side of the respective projection 2 (Fig. 6) and the third side 4, which may be called the base of the triangular portion, forms a shoulder for gripping the material adjacent an aperture of a supporting part after the attaching portion has been inserted therethrough. The broad faces of the socket-engaging portions 3 between the sides converge relative to each other toward the free ends of the projections 2 for squeezing the projections during insertion of the socket-engaging portions through an aperture of the socket means.

Figure 7:
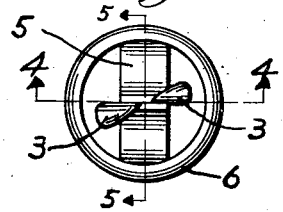
Fig. 7 is a bottom plan view of the fastener member.
Figure 8:
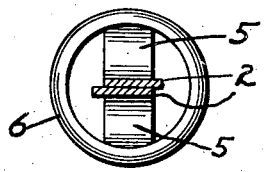
Fig. 8 is a section taken along the line 8—8 of Fig. 2.

In order that parts of the fastener may yield properly for engagement with a cooperating socket means, I have formed the projections 2 in such a way that they extend from the free ends of yieldable portions 5—5 (Figs. 5, 7 and 8) extending toward the center of the base from opposite ends thereof. When the projections 2—2 are squeezed to permit the shoulders 4—4 to pass through an aperture of the cooperating socket the portions 5—5 yield by a twisting action. After the shoulders pass through the cooperating aperture the projections are returned to their regular positions by the tendency of the portions 5—5 to return to their normal positions. A cap 6 may be assembled with the base 1 by clinching the walls of the cap beneath the yieldable portions 5—5, as shown in Fig. 5.

The construction of the snap fastener member herein described is an improvement over that of the above-mentioned patent, due to the fact that the curled attaching portions 3 of my present device do not cut the material adjacent a cooperating stud-receiving aperture during insertion of the stud member through the aperture as do the converging narrow edges of the device of the patent, thus permitting easier entrance and smoother action. Also, the curved formation of the shoulders 4 of my present device provide a greater bearing surface upon material adjacent the stud-receiving aperture than do the shoulders of the device of the patent whereby a more secure fastener means is provided.

Although I have illustrated and described a preferred form of my invention, I do not wish to be limited thereby, as the scope of my invention is best set forth in the following claims.

I claim:

1. A snap fastener stud having a base, a pair of flat projections extending from said base and arranged with their flat faces toward each other, said flat projections having portions adjacent their free ends extending transversely of the plane of said projections to make snap fastener engagement with cooperating socket means, and yieldable means connecting said projections to said base and adapted to permit movement of one projection relative to the other by a torsional movement of said yieldable portions when the stud is being engaged with or disengaged from cooperating fastening means.

2. A snap fastener stud having a base, a pair of flat projections extending from said base and arranged with their flat faces toward each other, each of said projections having a fastener socket-engaging portion integral with an edge near the free end, each of said socket-engaging portions extending transversely of the plane of said respective projection and having a shoulder, and yieldable means connecting said projections to said base and adapted to permit movement of one projection relative to the other by a torsional movement of said yieldable portions when the stud is being engaged with or disengaged from cooperating fastening means.

3. A snap fastener stud having a base, a pair of flat projections extending from said base and arranged with their flat faces toward each other, a socket-engaging portion integral with each of said projections adjacent a free end, said portions being slightly curved in cross-section and having an edge integral with an edge of said respective projection and a free edge in substantially superposed spaced relation to a flat face of said projection, the broad surfaces of said portions between said edges converging with relation to each other toward the free ends of said projections, and yieldable means connecting said projections to said base and adapted to permit movement of one projection relative to the other by a torsional movement of said yieldable portions when the stud is being engaged with or disengaged from cooperating fastening means.

4. A snap fastener stud having a base, a pair of flat projections extending from said base and arranged with their flat faces toward each other, each of said projections having a substantially triangular-shaped socket-engaging portion having a shoulder, each of said portions having its apex at the free end of said respective projection, a side integral with an edge of said projection adjacent said free end, and another side in spaced superposed relation to a flat face of said respective projection, the broad surfaces of said portions between said sides converging with relation to each other toward the free ends of said projections, and yieldable means connecting said projections to said base and adapted to permit movement of one projection relative to the other by a torsional movement of said yieldable portions when the stud is being engaged with or disengaged from cooperating fastening means.

5. A snap fastener stud having a base, a pair of flat socket-engaging projections extending from said base and arranged with their flat surfaces toward each other, each of said projections having a portion of its outer edge, at least at the free end thereof, turned outwardly away from the other of said projections at an angle to the plane of the flat side of itself for the purpose described.

GUSTAV JOHNSON.